Nov. 30, 1954     T. L. HANSON     2,695,948

PORTABLE IMMERSION HEATER

Filed June 10, 1953

INVENTOR.
Theodore L. Hanson
BY Thos. E. Scofield
ATTORNEY.

United States Patent Office 2,695,948
Patented Nov. 30, 1954

2,695,948

PORTABLE IMMERSION HEATER

Theodore Louis Hanson, Kansas City, Mo.

Application June 10, 1953, Serial No. 360,698

12 Claims. (Cl. 219—41)

The present invention relates in general to electrical immersion heating devices, and it deals more particularly with an immersion heater for use in preparing hot beverages.

An object of the invention is to provide a portable self-contained unit capable of heating an individual portion of beverage (say, a cupful) very rapidly.

Another object is to provide a heating unit constructed to heat a beverage such as coffee or bouillon directly in a drinking cup, thereby obviating the use of additional pots, pans or other utensils that would require cleaning.

A further object is to provide a unit of the kind indicated having an electrical heating element and, permanently associated therewith in the interest of cleanliness and safety, closure means for covering and completely concealing the element when same is not in use. A novel feature of the invention resides in the fact that the closure means is so constructed and arranged as to serve in a dual capacity, acting not only as a cover for the heating element when the unit is to be stored but also as a support for the element when the unit is in use.

Aligned with and supplementing the foregoing objectives, it is a further aim of the invention to provide a unit that can be closed for storage, and which can be opened and placed in use very quickly and with almost no effort at all, whereby the unit is exceedingly convenient and easy to use.

Still another object is to provide a portable heating unit which, when closed as previously suggested, is neat, attractive and very compact, whereby it is ideally suited, for example, to the needs of travelers who must pack their belongings in suitcases or like bags.

Other and further objects of the invention, together with the features of novelty whereby the objects are achieved will appear in the course of the following description.

In the accompanying drawings which form a part of the specification and are to be read in conjunction therewith, and in which like reference numerals are employed to indicate like parts of the various views.

Figure 1:
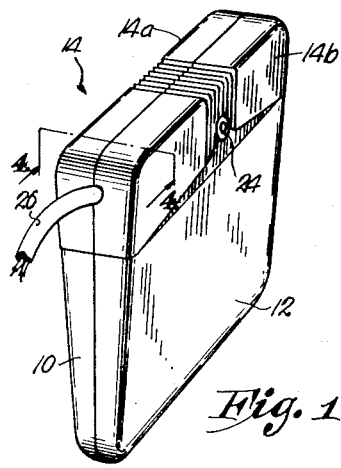
Fig. 1 is a perspective view of my beverage heating device showing same in closed condition, as for storage.
Figure 2:
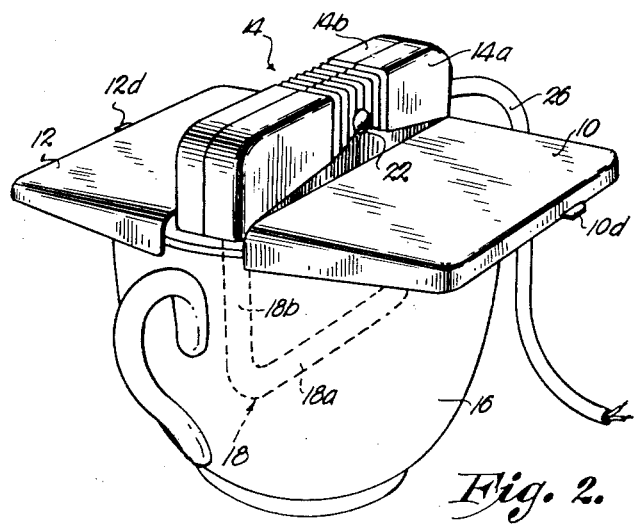
Fig. 2 is a reversed perspective view of the unit in open condition showing the manner in which it is used to heat a cup of beverage.
Figure 3:
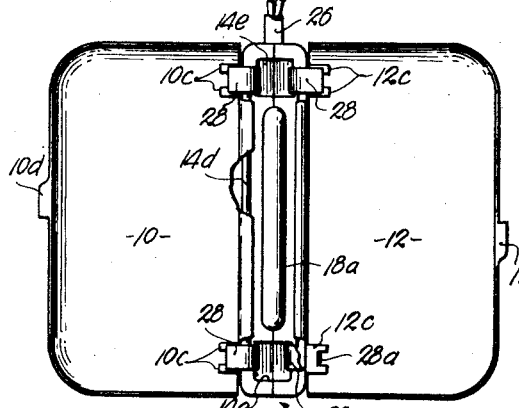
Fig. 3 is an inverted plan view of the unit in open condition, parts being broken away for purposes of illustration.
Figure 5:
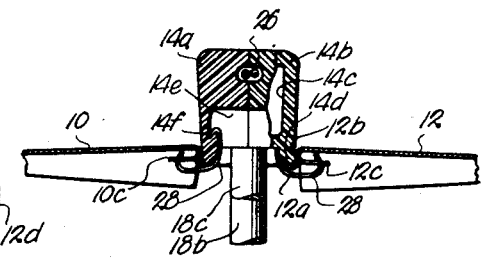
Fig. 5 is a fragmentary cross-sectional view corresponding to Fig. 4 but showing the doors or covers swung open.
Figure 4:
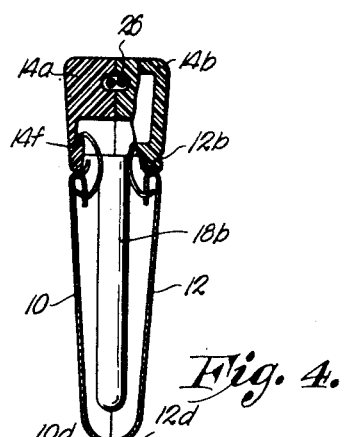
Fig. 4 is a cross-sectional view taken approximately along the plane 4—4 of Fig. 1 in the direction of the arrows.

Referring more particularly to the drawings, my unit has a pair of doors or covers 10 and 12 hingedly mounted on a body or back member 14. Details of the mounting arrangement will be described presently, but it can be understood at the outset that the covers are adapted to swing together as shown in Figs. 1 and 4 when the device is not in use, and to swing apart as shown in Figs. 2 and 5 when the unit is to be employed for heating the beverage contained in a cup 16.

When the covers are swung apart as far as they will go, they project outwardly from the back approximately at right angles thereto, forming a substantially horizontal table which can rest on the rim of the cup and support the back member in the position illustrated. An electrically energized U-shaped heating element 18 projects downwardly from the back for a distance adequate to insure that the bight portion 18a and the lower sections of the legs 18b and 18c will be immersed in the beverage or other liquid in the cup to heat same.

The construction of the immersion heater per se is conventional, so will be described but briefly. It comprises a hollow rod or tube bent to the U-shape shown, the rod being made of stainless steel or, if preferred, having its exterior surface suitably plated and brightly finished for cleanliness. Within the hollow rod (but insulated therefrom to prevent the flow of stray currents through the rod itself) is an electrical resistance element whose two ends or terminals project upwardly into the interior of the body or back member 14 for connection to the power supply.

The back member is made of insulating material, preferably being of molded plastic construction. For convenience of assembly, I prefer to make it in two halves 14a and 14b which can be secured together by a screw 22 and nut 24 or any other suitable form of fastener. The upper extremities of the legs of the immersion heater are clamped between the two halves for support.

At one end, the back member is apertured to receive an electrical cord 26 whose conductors 26a and 26b, it will be understood, are connected to the two terminals of the immersion heater 18. The opposite end of the cord 26 has a plug or other conventional fitting (not shown) by which it can be connected to an electrical outlet for the purpose of energizing the heater.

The mid-section of the body 14 is hollowed out to provide a compartment 14c between the mounted ends of the heater legs 18b and 18c; if desired, this compartment can be utilized to house a small thermostat of the bimetallic circuit breaker type arranged to prevent overheating of the unit. Around the lower margin of the body, there is an integral downwardly projecting circumferential rim or bead 14d, and adjacent the two ends are upwardly extending cavities or pockets 14e. As may best be seen in Figs. 4 and 5, the side walls of these pockets are undercut to provide notches 14f for receiving the ends of the cover springs 28 presently to be described.

The two covers or door panels 10 and 12 are identical; conveniently, they can be stamped of sheet metal in the shape shown. Along the medial portion of the edge which adjoins the back, each cover has an offset flange or lip (10a, 12a) forming a shoulder (10b, 12b) that is held seated against the bead 14d by the tension of springs 28. At opposite extremities of the medial flange, each cover also has a pair of doubled-back lugs or ears (10c, 12c) that are notched at their free ends as illustrated. The four springs 28 are generally C-shaped, each having at one end a tongue 28a that is received in one of the last mentioned notches to hold the spring centered with respect to the associated lug; the opposite end of the spring extends upwardly into the cavity 14e and is hooked into one of the notches 14f.

Each spring has its two ends tensioned toward each other, thereby to maintain the shoulders 10b, 12b of the respective covers firmly seated on the lower edges or beads 14d of the back member as previously mentioned. Referring to Fig. 4 and considering particularly the line along which each shoulder has its bearing on the edge of the back member, it will be seen that this line is spaced outwardly relative to the axis along which the tension of the spring acts as it applies an upward thrust on lugs 10c and 12c. Due to the inwardly offset position of the thrust axis of each pair of springs relative to the bearing line of the associated cover itself, the springs not only serve to maintain the shoulders (10b, 12b) seated on the back member as described, but also apply a torque on the covers urging them inwardly and maintaining them seated firmly against each other, as indicated in Fig. 4.

The two covers or doors have opposed finger tabs 10d and 12d by which their lower edges may be separated to initiate opening thereof. As each cover swings upwardly from its Fig. 4 position, the lower ends of springs 28 pass over center with respect to the aforementioned bearing line of the cover on the back member 14, so that spring tension then applies a torque which assists in raising the covers to the position shown in Fig. 5; in the latter position, the medial portion of the springs engage the lower edge of beads 14d and prevent elevation of the covers beyond the Fig. 5 position. The two cover panels thus are held outspread by the springs and will move neither upwardly nor downwardly until they are manually forced back toward Fig. 4 position against the tension of the springs. As they approach the latter position, the effective axis of the springs again pass over center so that the covers are snapped shut.

The manner of using my device is believed to be relatively obvious. With the covers outspread as shown in Fig. 2, the unit is simply permitted to rest on the rim of a cup 16 containing the beverage or other liquid to be heated. Cord 26 is plugged into a suitable source of electrical current to energize the immersion heater 18 and cause same to give off its heat to the liquid in which it is immersed. Thus, by first placing a small amount of dry "instant" coffee concentrate in the cup and then filling same with cold water, it is possible with the aid of my device to brew a cup of coffee very rapidly; similarly, if a bouillon cube is used instead of the coffee concentrate, a cup of hot bouillon is obtained. The outspread cover panels 10 and 12 serve as a lid for the cup during the heating interval.

When the beverage is hot, cord 26 is disconnected from the source of current and the unit may be lifted from the cup by means of the back member 14 which, it will be remembered, is constructed of insulating material and remains relatively cool to the hand despite the high temperature of the heater 18. It will be noted that covers 10 and 12 shield the hand from the radiant heat of the element 18. The latter will dry itself almost immediately upon removal from the liquid due to its retained heat, and the covers or doors may then be swung back to the position shown in Figs. 1 and 4, completely enclosing the heating element so that the unit may be stored away without danger even before the element is completely cool.

When closed, my unit is of compact and attractive wedge shape, the outer walls of the two covers converging slightly toward one another and forming in each case a continuation of the side portion of the back member 14. For purposes of appearance, the exterior of the latter may be embossed or otherwise decorated in any desired fashion as indicated.

Figure 6:
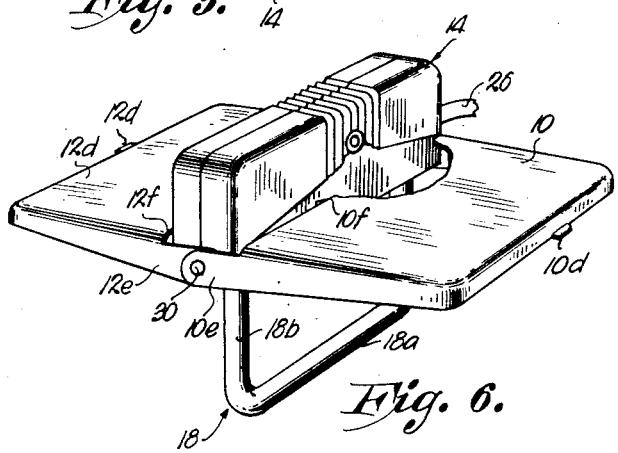
Fig. 6 is a perspective view of a slightly modified form of the device, parts being broken away for purposes of illustration.

In Fig. 6, I have shown an alternative way of swingably mounting the covers on the back member, the unit being in all other respects identical to the one already described. According to this construction, I provide at each end of the body 14 a single pivot pin, the two pins being coaxial. Each of these pins extends through registering apertures in the ears 10e and 12e, the latter being extensions of the side flange portions of the respective covers. As will be readily understood from the drawing, the extent to which the covers may be swung open is limited by abutment of the edges 10f and 12f against the side walls of the head 14. The manner in which the unit is used is essentially the same as has already been described.

From the foregoing, it will be seen that this invention is one well adapted to attain all of the ends and objects hereinbefore set forth, together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as many possible modifications of the invention may be made without departing from the scope thereof, it is to be understood that all matter herein set forth or shown in the accompanying drawings is to be interpreted as illustrative and not in a limiting sense.

Having thus described my invention, I claim:

1. In a device of the kind described, a body, a heat-generating element mounted on said body and projecting outwardly therefrom, a pair of complementary covers hingedly mounted on said body and having a closed position wherein the respective covers are disposed on opposite sides of the element and substantially parallel thereto, said covers being swingable from said closed position upwardly and outwardly to a predetermined open position wherein they project in opposite directions from said body and are substantially normal to said element.

2. A device as in claim 1, wherein each cover comprises a door hinged along one edge to the body and having along the remaining edges a marginal flange adapted to seat against the corresponding flange of the other door when both doors are in closed position.

3. A device as in claim 1 having spring means yieldably resisting movement of said covers away from closed position.

4. A device as in claim 1 having means limiting the upward movement of said covers.

5. A device as in claim 1 having means limiting the upward movement of said covers, and spring means for biasing the covers toward the upward limit position.

6. A portable heating device for use with an open-top vessel, said device comprising a body, means for supporting said body centrally over the open top of the vessel, said means including a plurality of arms outspread from the body to rest on the rim of the vessel, an immersion heater mounted on the body to project downwardly therefrom into the vessel, and means swingably mounting said arms on said body to fold downwardly about said heater and enclose same when the device is not in use.

7. A portable heating device for use with an open-top vessel, said device comprising a body, means for supporting said body centrally over the open top of the vessel, said means including a plurality of arms outspread from the body to rest on the rim of the vessel, an immersion heater mounted on the body to project downwardly therefrom into the vessel, said body comprising an insulating hand grip by which said device can be lifted from the vessel, and means swingably mounting said arms on the body to fold downwardly about said heater and enclose same when the device is lifted from the vessel.

8. A portable heating device for use with an open-top vessel, said device comprising an elongate body, a pair of panels extending laterally from opposite sides of the body to rest on the rim of the vessel and support the body centrally over the top opening, an immersion heating element mounted on the body to project downwardly therefrom into the vessel, and means swingably mounting said panels to fold downwardly adjacent opposite sides of said element to shield same when the device is not in use.

9. A device as in claim 8 wherein said heating element is U-shaped.

10. A device as in claim 8 having spring means yieldably resisting said downward movement of the panels.

11. A device as in claim 8 wherein said panels have complementary side and bottom flanges adapted to seat against one another when the panels are folded downwardly, thereby to wholly enclose the heating element.

12. A device as in claim 11 having spring means between the body and covers yieldably resisting movement of said flanges away from one another.

References Cited in the file of this patent

UNITED STATES PATENTS

| Number | Name | Date |
|---|---|---|
| 1,599,912 | Naujoks | Sept. 14, 1926 |
| 2,291,367 | Bezosky | July 28, 1942 |